(12) United States Patent
Ominato et al.

(10) Patent No.: US 10,345,578 B2
(45) Date of Patent: Jul. 9, 2019

(54) LATERAL MAGNIFICATION OF A SCANNING OPTICAL UNIT FOR USE IN AN ELECTROPHOTOGRAPHIC IMAGE FORMING APPARATUS

(71) Applicant: Brother Kogyo Kabushiki Kaisha, Nagoya-shi, Aichi-ken (JP)

(72) Inventors: Hiroyuki Ominato, Nagoya (JP); Hitoshi Fujino, Tajimi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 15/903,135

(22) Filed: Feb. 23, 2018

(65) Prior Publication Data
US 2018/0239128 A1 Aug. 23, 2018

(30) Foreign Application Priority Data
Feb. 23, 2017 (JP) .................. 2017-031789

(51) Int. Cl.
| | | |
|---|---|---|
| *G03G 15/04* | (2006.01) | |
| *G02B 26/10* | (2006.01) | |
| *F21V 13/04* | (2006.01) | |
| *G03G 15/28* | (2006.01) | |
| *G02B 26/12* | (2006.01) | |

(52) U.S. Cl.
CPC .......... *G02B 26/101* (2013.01); *F21V 13/04* (2013.01); *G02B 26/106* (2013.01); *G02B 26/123* (2013.01); *G02B 26/125* (2013.01); *G03G 15/0409* (2013.01); *G03G 15/28* (2013.01)

(58) Field of Classification Search
CPC .................................................. G02B 26/101
USPC ............................................................ 399/4
See application file for complete search history.

(56) References Cited

U.S. PATENT DOCUMENTS

| | | | |
|---|---|---|---|
| 8,982,422 B2* | 3/2015 | Iwata ................. | H04N 1/40037 347/135 |
| 2011/0052263 A1* | 3/2011 | Tatsuno ............... | G02B 26/123 399/221 |
| 2011/0080624 A1 | 4/2011 | Ku | |

(Continued)

FOREIGN PATENT DOCUMENTS

| | | |
|---|---|---|
| JP | 2007-045094 A | 2/2007 |
| JP | 2011-081382 A | 4/2011 |

*Primary Examiner* — Quana Grainger
(74) *Attorney, Agent, or Firm* — Banner & Witcoff, Ltd.

(57) ABSTRACT

Scanning optical unit includes: light source; incident optical system including one coupling lens for converting light from the light source into a light beam; optical deflector having a reflecting surface and configured to reflect and deflect the light beam in main scanning direction; and scanning optical system for focusing the deflected light beam on an image surface. The incident optical system converges the light beam on the reflecting surface in sub-scanning direction. Further, $0.01 \leq (\beta s/\beta m)^2 \leq 0.27$ and $\beta s2 < 1$ are satisfied, where $\beta m$ is a lateral magnification of the entire optical system from the light source to the image surface in the main scanning direction, $\beta s$ is a lateral magnification of the entire optical system in the sub-scanning direction, and $\beta s2$ is a lateral magnification of the scanning optical system from the reflecting surface of the optical deflector to the image surface in the sub-scanning direction.

20 Claims, 6 Drawing Sheets

(56) References Cited

U.S. PATENT DOCUMENTS

2013/0077144 A1* 3/2013 Nakamura ............ G02B 26/124
                   359/226.1
2014/0160546 A1* 6/2014 Hoshino ................ G02B 7/008
                   359/206.1

* cited by examiner

LATERAL MAGNIFICATION OF A SCANNING OPTICAL UNIT FOR USE IN AN ELECTROPHOTOGRAPHIC IMAGE FORMING APPARATUS

CROSS-REFERENCE TO RELATED APPLICATION(S)

This application claims priority from Japanese Patent Application No. 2017-031789 filed on Feb. 23, 2017, the disclosure of which is incorporated herein by reference in its entirety.

TECHNICAL FIELD

An aspect of this disclosure relates to a scanning optical unit used, for example, in an image forming apparatus, and an image forming apparatus equipped with such a scanning optical unit.

BACKGROUND ART

In a scanning optical unit used in an electrophotographic image forming apparatus, light emitted from a light source is collimated into a light beam with a collimating lens, and this light beam is deflected in a main scanning direction by rotating reflecting surfaces of an optical deflector, and then the deflected light beam is focused on a photoconductor drum through a scanning lens. An incident optical system provided between the light source and reflecting surfaces of the optical deflector causes the light beam to converge in a sub-scanning direction and to be focused on the reflecting surfaces, whereas a scanning optical system provided between the optical deflector and the photoconductor drum causes the light beam reflected by the reflecting surfaces to converge in the main scanning direction and in the sub-scanning direction to form an image.

There is conventionally known a scanning optical unit, in which a ratio of a lateral magnification $\beta s$ in the sub-scanning direction to a lateral magnification $\beta m$ in the main scanning direction is specified.

SUMMARY

However, if the lateral magnification of the scanning optical unit in the sub-scanning direction is small, the light path length of the incident optical system becomes disadvantageously longer in the conventional scanning optical unit.

In view of the above, it would be desirable to provide a scanning optical unit, which can reduce the light path length of the incident optical system, and an image forming apparatus equipped with the scanning optical unit.

In one aspect, there is provided a scanning optical unit, which comprises a light source, an incident optical system including one coupling lens configured to convert light emitted from the light source into a light beam, an optical deflector having a reflecting surface and configured to reflect and deflect the light beam from the incident optical system in a main scanning direction, and a scanning optical system configured to focus the light beam deflected by the optical deflector on an image surface.

The incident optical system is configured to converge the light beam on the reflecting surface of the optical deflector in a sub-scanning direction orthogonal to the main scanning direction.

Further, the following conditions are satisfied:

$$0.01 \leq (\beta s/\beta m)^2 \leq 0.27 \text{ and}$$

$$\beta s2 < 1$$

where $\beta m$ is a lateral magnification of an entire optical system from the light source to the image surface in the main scanning direction, $\beta s$ is a lateral magnification of the entire optical system in the sub-scanning direction, and $\beta s2$ is a lateral magnification of the scanning optical system from the reflecting surface of the optical deflector to the image surface in the sub-scanning direction.

In another aspect, there is provided an image forming apparatus, which comprises a photoconductor, a scanning optical unit configured to expose the photoconductor to light to form an electrostatic latent image on the photoconductor, and a development unit configured to develop the electrostatic latent image formed on the photoconductor.

The scanning optical unit includes a light source, an incident optical system including one coupling lens configured to convert light emitted from the light source into a light beam, an optical deflector having a reflecting surface and configured to reflect and deflect the light beam from the incident optical system in a main scanning direction, and a scanning optical system configured to focus the light beam deflected by the optical deflector on the photoconductor.

The incident optical system is configured to converge the light beam on the reflecting surface of the optical deflector in a sub-scanning direction orthogonal to the main scanning direction.

Further, the following conditions are satisfied:

$$0.01 \leq (\beta s/\beta m)^2 \leq 0.27 \text{ and}$$

$$\beta s2 < 1$$

where $\beta m$ is a lateral magnification of an entire optical system from the light source to the photoconductor in the main scanning direction, $\beta s$ is a lateral magnification of the entire optical system in the sub-scanning direction, and $\beta s2$ is a lateral magnification of the scanning optical system from the reflecting surface of the optical deflector to the photoconductor in the sub-scanning direction.

In a further aspect, there is provided an image forming apparatus, which comprises a plurality of photoconductors, a scanning optical unit configured to expose the plurality of photoconductors to light to form electrostatic latent images on the plurality of photoconductors, and a plurality of development units configured to develop the respective electrostatic latent images formed on the plurality of photoconductors.

The scanning optical unit includes a plurality of light sources, a plurality of incident optical systems each having one coupling lens configured to convert light emitted from one of the plurality of light sources into a light beam, a single optical deflector having a reflecting surface and configured to reflect and deflect a plurality of light beams from the plurality of incident optical systems in a main scanning direction, and a scanning optical system configured to focus the plurality of light beams deflected by the optical deflector each on a corresponding photoconductor.

Each of the incident optical systems is configured to converge the light beam on the reflecting surface of the optical deflector in a sub-scanning direction orthogonal to the main scanning direction, and is disposed such that in the sub-scanning direction, the light beam is incident obliquely on the reflecting surface of the optical deflector.

Further, the following conditions are satisfied:

$$0.01 \leq (\beta s/\beta m)^2 \leq 0.27 \text{ and}$$

$$\beta s2 < 1$$

where βm is a lateral magnification of an entire optical system from each of the plurality of light sources to the corresponding photoconductor in the main scanning direction, βs is a lateral magnification of the entire optical system in the sub-scanning direction, and βs2 is a lateral magnification of the scanning optical system from the reflecting surface of the optical deflector to the corresponding photoconductor in the sub-scanning direction.

BRIEF DESCRIPTION OF THE DRAWINGS

The above and other aspects, their advantages and further features of the present invention will become more apparent by describing in detail illustrative, non-limiting embodiments thereof with reference to the accompanying drawings, in which.

DESCRIPTION OF EMBODIMENTS

Figure 1:
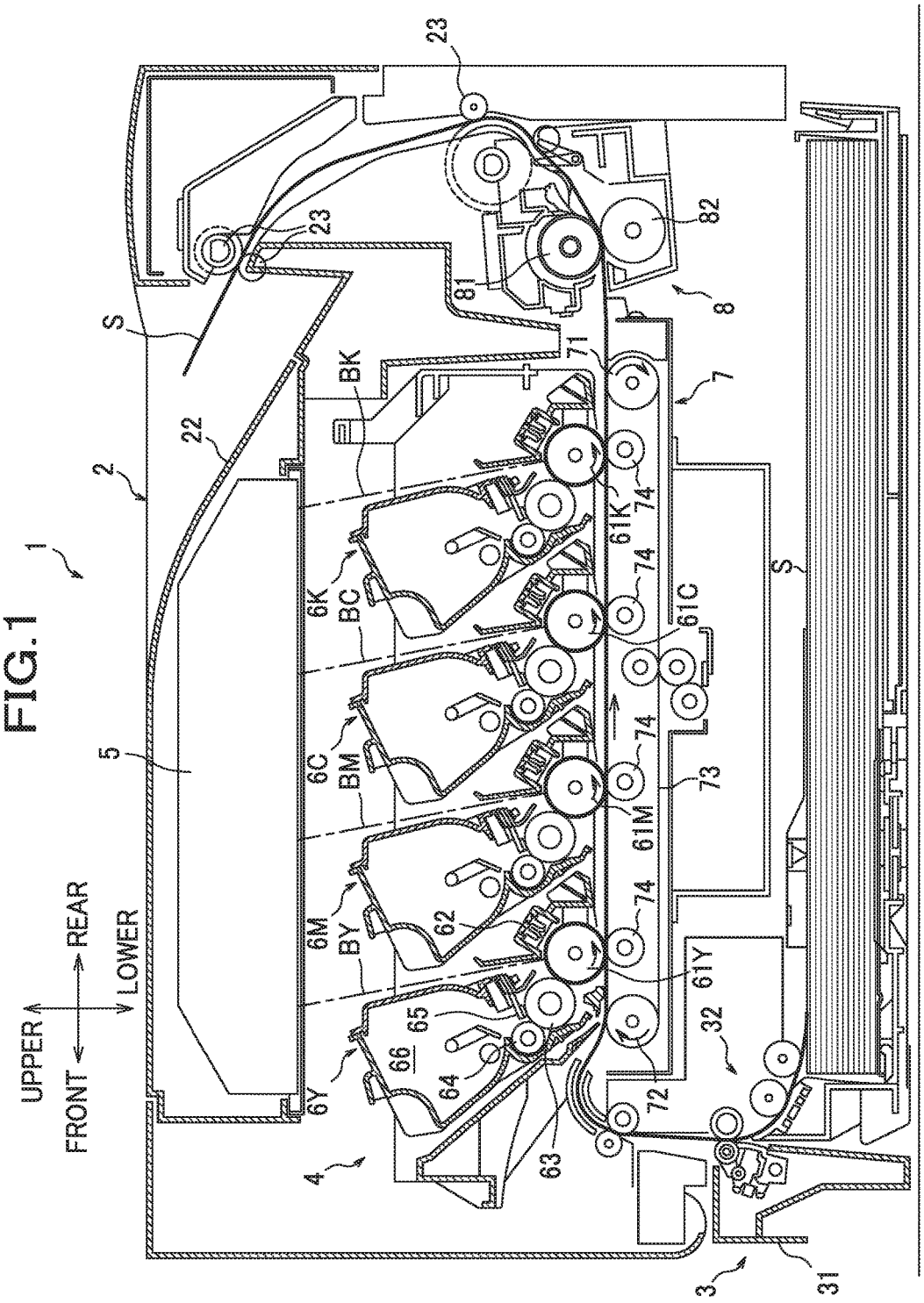
FIG. 1 is a schematic sectional view of a color printer as an example of an image forming apparatus.

In the following description, which will be given with reference to the accompanying drawings, the direction is designated as from the viewpoint of a user who is using (operating) a color printer 1. To be more specific, in FIG. 1, the left-hand side of the drawing sheet corresponds to the "front" side of the color printer 1, the right-hand side of the drawing sheet corresponds to the "rear" side of the color printer 1, the front side of the drawing sheet corresponds to the "right" side of the color printer 1, and the back side of the drawing sheet corresponds to the "left" side of the color printer 1. The direction extending from top to bottom or from bottom to top of the drawing sheet corresponds to the "vertical" or "upper-lower" (upward/downward, up/down, upper/lower or top/bottom) direction of the color printer 1.

As seen in FIG. 1, a scanning optical unit 5 according to this embodiment is used in a color printer 1. The color printer 1 includes a main body casing 2 and various components installed in in the main body casing 2, such as a sheet feed unit 3 for feeding a sheet S, and an image forming unit 4 for forming an image on the sheet S to be fed from the sheet feed unit 3. The image forming unit 4 mainly includes a scanning optical unit 5, four process units 6 (6Y, 6M, 6C, 6K), a transfer unit 7, and a fixing unit 8.

The sheet feed unit 3 is provided in a lower space within the main body casing 2, and mainly includes a sheet feed tray 31 for storing a stack of sheets S as an example of media to which a toner image is to be transferred, and a sheet feed mechanism 32 configured to supply a sheet S from the sheet feed tray 31 to the image forming unit 4. The stack of sheets S stored in the sheet feed tray 31 is separated by the sheet feed mechanism 32 and conveyed on one-by-one basis toward the image forming unit 4.

The scanning optical unit 5 is provided in an upper space within the main body casing 2. The scanning optical unit 5 irradiates the surface of each of the photoconductor drums 61 with a light beam B (BY, BM, BC, BK) based on the print data, so that the surfaces of the photoconductor drums 61 are exposed to light to form electrostatic latent images.

Four process units 6 are disposed between the sheet feed tray 31 and the scanning optical unit 5 and arranged tandem in the front-rear direction. Each process unit 6 mainly includes a photoconductor drum 61 (61Y, 61M, 61C, 61K) as an example of a photoconductor, a charger 62, a development roller 63, a supply roller 64, a doctor blade 65, and a toner storage portion 66 configured to store positively charged toner (developer).

The process units 6 include a yellow process unit 6Y for yellow color printing in which yellow toner (not shown in the drawings) is stored, a magenta process unit 6M for magenta color printing in which magenta toner (not shown in the drawings) is stored, a cyan process cartridge 6C for cyan color printing in which cyan toner (not shown in the drawings) is stored, and a black process unit 6K for black color printing in which black toner (not shown in the drawings) is stored, and these process units 6Y, 6M, 6C, 6K are arranged in this order from the front side (i.e., from upstream side along a conveyance direction of a sheet S). In the description and the drawings, for specifying the photoconductor drum 61, etc. by the color of each toner, a suffix such as Y for yellow, M for magenta, C for cyan, and K for black will be added to the reference number.

The transfer unit 7 is disposed between the sheet feed tray 31 and the process units 6. The transfer unit 7 mainly includes a drive roller 71, a driven roller 72, an endless conveyor belt 73 looped around the drive roller 71 and the driven roller 72, and four transfer rollers 74. The conveyor belt 73 has an outer surface in contact with the photoconductor drums 61. The four transfer rollers 74 are disposed inside the conveyor belt 73 opposite the corresponding photoconductor drums 61 with the conveyor belt 73 being held therebetween.

The fixing unit 8 is disposed at the rear of the process units 6 and the transfer unit 7. The fixing unit 8 mainly includes a heating roller 81, and a pressure roller 82 positioned opposite the heating roller 81 and pressed against the heating roller 81.

In the image forming unit 4, the surface of each photoconductor drum 61 is positively and uniformly charged by the corresponding charger 62, and then exposed to the light beam B emitted from the scanning optical unit 5. As a result, an electrostatic latent image based on the print data is formed on the surface of the photoconductor drum 61. Thereafter, the toner carried on the development roller 63 is supplied onto the electrostatic latent image formed on the photoconductor drum 61, so that the electrostatic latent image is visualized and a toner image is formed on the surface of the photoconductor drum 61.

The sheet S supplied from the sheet feed unit 3 is conveyed on the conveyor belt 73 from the front end toward the rear end and passes between the photoconductor drums 61 and transfer rollers 74 while in contact with the photoconductor drums 61. During the course of this process, the toner images on the photoconductor drums 61 are transferred sequentially onto the sheet S between the photoconductor drums 61 and the transfer rollers to which a transfer bias is applied, so that they are superimposed one on top of another to form a composite toner image. When the sheet S to which the composite toner image is transferred passes between the heating roller 81 and the pressure roller 82, the composite toner image is thermally fixed. The sheet S with the composite toner image thermally fixed thereon is then conveyed by conveyor rollers 23 and ejected out from the main body casing 2 onto a sheet output tray 22.

Figure 2:
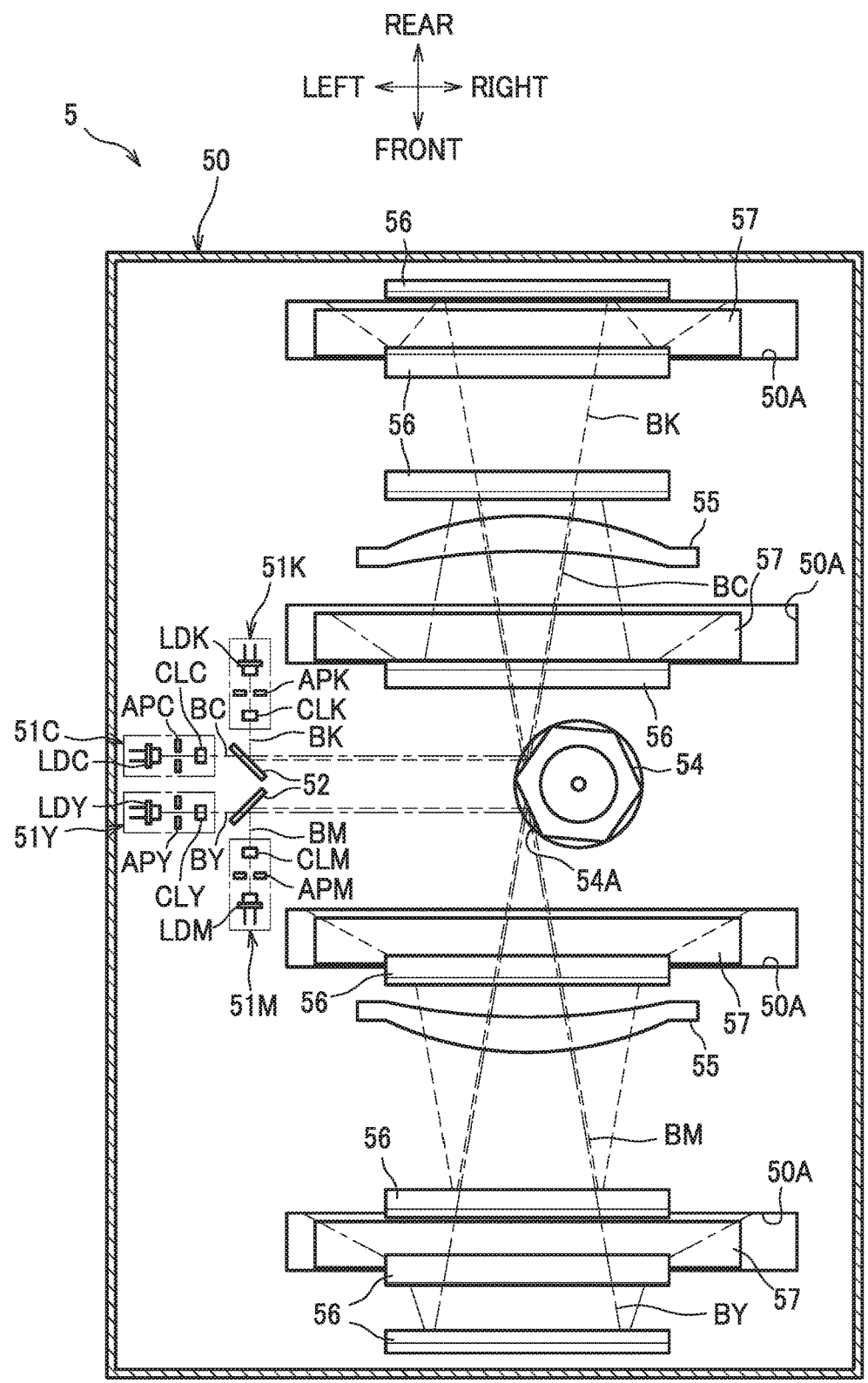
FIG. 2 is a plan view of a scanning optical unit.
Figure 3:
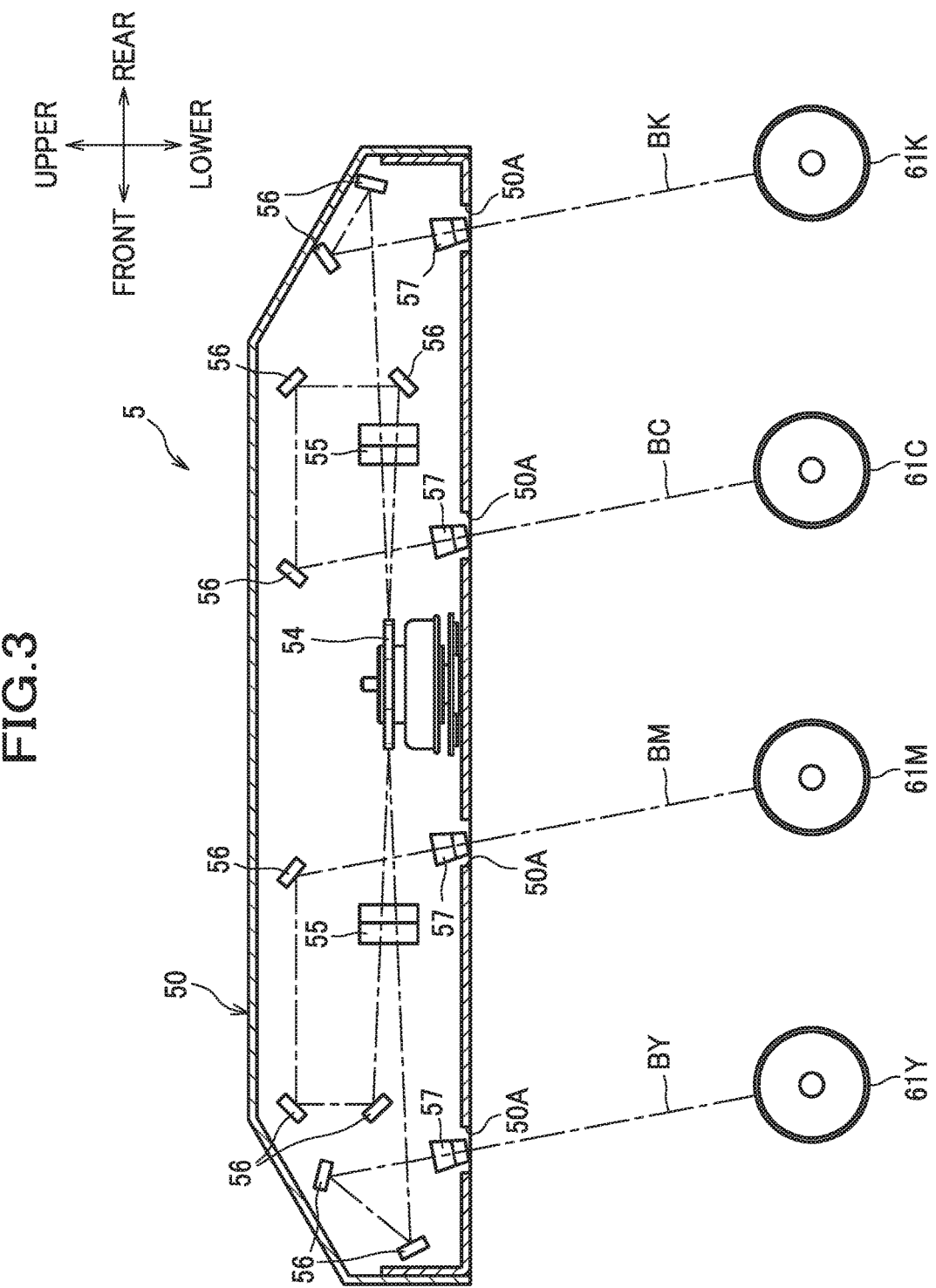
FIG. 3 is a vertical section of the scanning optical unit.

As seen in FIGS. 2 and 3, the scanning optical unit 5 includes various components installed in a casing 50, mainly such as four light source devices 51, two reflecting mirrors 52, a polygon mirror 54, two f-theta lenses (fθ lenses) 55, a plurality of reflecting mirrors 56, and four correcting lenses 57.

The light source devices 51 are devices each configured to emit a light beam B. Each of the light source devices 51 mainly includes a semiconductor laser LD as an example of a light source, an aperture stop AP, and a coupling lens CL.

Figure 6:
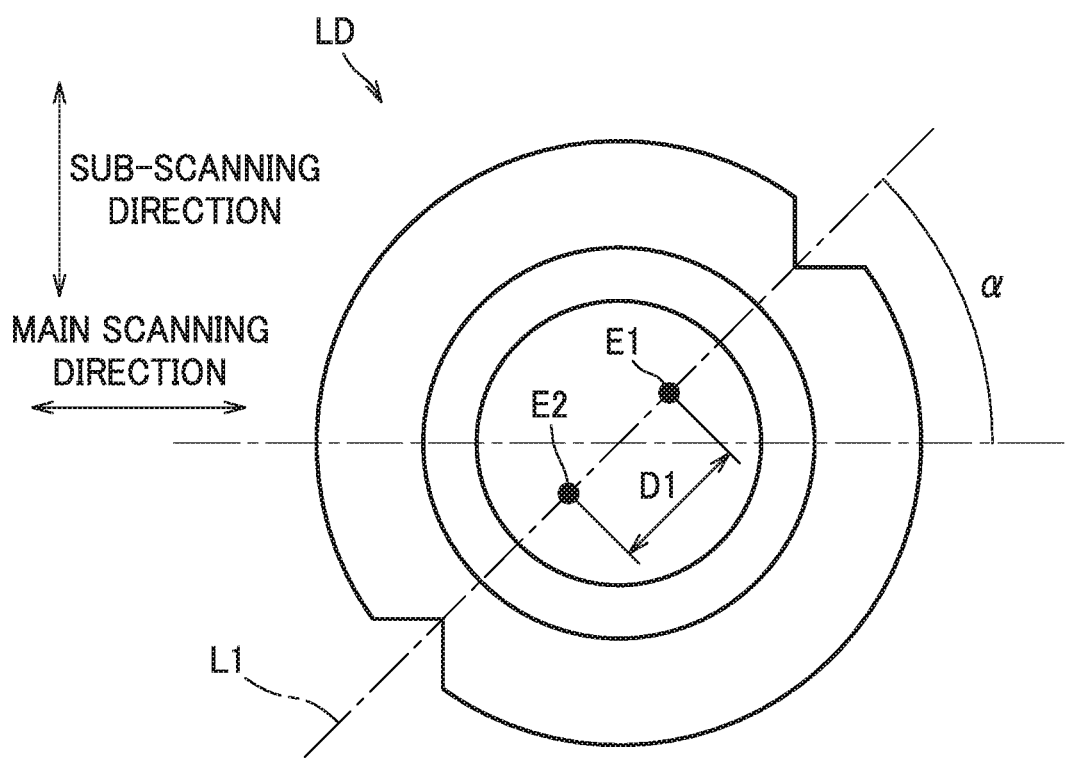
FIG. 6 is a front view of a semiconductor laser.

The semiconductor laser LD may be a semiconductor laser array including a plurality of light emitters. For example, as seen in FIG. 6, the semiconductor laser LD has two light emitters E1, E2 consisting of two light emitting elements; the light emitters E1, E2 are arranged spaced apart from each other at a predetermined distance. For example, a distance D1 between the centers of the light emitter E1 and the light emitter E2 is 30 micrometers. The line L1 connecting the two light emitters E1, E2 of the semiconductor laser LD is slanted with respect to the main scanning direction. The line L1 is at an angle α with respect to the main scanning direction, and the angle α of the line L1 is set in accordance with a distance in the sub-scanning direction of the centers of images formed on an image surface 61A of the surface of the photoconductor drum 61 by the two light emitters E1, E2.

It should be noted that the main scanning direction refers to a direction along which the light beam B deflected by the polygon mirror 54 sweeps, and the sub-scanning direction refers to a direction orthogonal to the travelling direction of the light beam B and to the main scanning direction.

As seen in FIGS. 2 and 3, the coupling lens CL collimates laser light emitted from the semiconductor laser LD to convert it into a light beam. Further, to correct optical face tangle errors of the polygon mirror 54, the coupling lens CL refracts and collimates the light beam B in the sub-scanning direction to bring the light beam B into focus on the reflecting surfaces of the polygon mirror 54 as a linear image elongated in the main scanning direction. The coupling lens CL that is a lens disposed between the semiconductor laser LD and the polygon mirror 54 forms an incident optical system. In other words, the incident optical system consists of one single lens in this exemplary embodiment.

Preferably, the coupling lens CL has a diffraction surface at least at one surface thereof. As an example, the coupling lens CL may have a diffraction surface at an incident-side surface CLi thereof (see FIG. 4). The diffraction surface is axisymmetric, and a diffraction power in the main scanning direction is equal to a diffraction power in the sub-scanning direction. Further, the coupling lens CL may have a non-axisymmetrical refraction surface at an exit-side surface CLe thereof (see FIG. 4). To be more specific, a refractive power in the sub-scanning direction is greater than a refractive power in the main scanning direction at the exit-side surface CLe of the coupling lens CL. Further, the coupling lens CL may be made of plastic. If the incident optical system consists of one single lens, the manufacturing cost can be reduced. Further, if the coupling lens CL is a plastic lens, the manufacturing cost can be reduced.

The aperture stop AP is a plate member having a substantially rectangular opening; the laser light emitted from the semiconductor laser LD is defined to have a predetermined size when the laser light passes through the opening of the aperture stop AP.

The light source devices 51Y, 51C are arranged in the front-rear direction. Meanwhile, the light source devices 51M, 51K are arranged face-to-face in the front-rear direction such that the light beams BM, BK emitted therefrom cross substantially at right angles to the light beams BY, BC emitted from the light source devices 51Y, 51C.

The reflecting mirror 52 is a member configured to reflect the light beams BM, BK emitted from the light source devices 51M, 51K toward the polygon mirror 54. The light beams BY, BC from the light source devices 51Y, 51C pass over the reflecting mirrors 52 and enter the polygon mirror 54.

The polygon mirror 54 has six reflecting surfaces 54A disposed equidistantly from an axis of rotation. The reflecting surfaces 54A of the polygon mirror 54 spin at a constant rotational speed around the axis of rotation and reflect and deflect the light beam B having passed through the coupling lens CL in the main scanning direction (i.e., lateral direction in FIG. 2).

The f-theta lens 55 has f-theta characteristics such that the light beam B deflected at a constant angular velocity by the polygon mirror 54 is converted into a light beam that scans the surface of the photoconductor drum 61 in the main scanning direction at a constant linear velocity. Preferably, the f-theta lens 55 may be made of plastic. If the f-theta lens 55 is made of plastic, the manufacturing cost can be reduced.

The reflecting mirrors 56 are members each configured to reflect the light beam B having passed through the f-theta lens 55 toward the correcting lens 57.

The correcting lens 57 is a lens for correcting optical face tangle errors of the polygon mirror 54. The correcting lens 57 refracts and converges the light beam B in the sub-scanning direction to bring the light beam B into focus on the image surface 61A of the surface of the photoconductor drum 61. Preferably, the correcting lens 57 may be made of plastic. If the correcting lens 57 is made of plastic, the manufacturing cost can be reduced.

The f-theta lenses 55 and the correcting lenses 57 each disposed between the polygon mirror 54 (reflecting surface 54A of the polygon mirror 54) and the image surface 61A of the corresponding photoconductor drum 61 form a scanning optical system. In other words, the scanning optical system includes a plurality of lenses.

As seen in FIG. 2, in the scanning optical unit 5, the light beams BY, BC emitted from the light source devices 51Y, 51C are deflected in the main scanning direction by the polygon mirror 54. The light beams BM, BK emitted from the light source devices 51M, 51K are reflected by the reflecting mirrors 52 and change their directions toward the polygon mirror 54, and thereafter the light beams BM, BK are deflected in the main scanning direction by the polygon mirror 54. As seen in FIG. 3, the light beam B deflected by the polygon mirror 54 passes through the f-theta lens 55 and is reflected by the reflecting mirrors 56. The light beam B then passes through the correcting lens 57 and an exposure opening 50A formed in the bottom surface of the casing 50 to scan the surface of the photoconductor drum 61, so that the surface of the photoconductor drum 61 is exposed to light.

Figure 4:
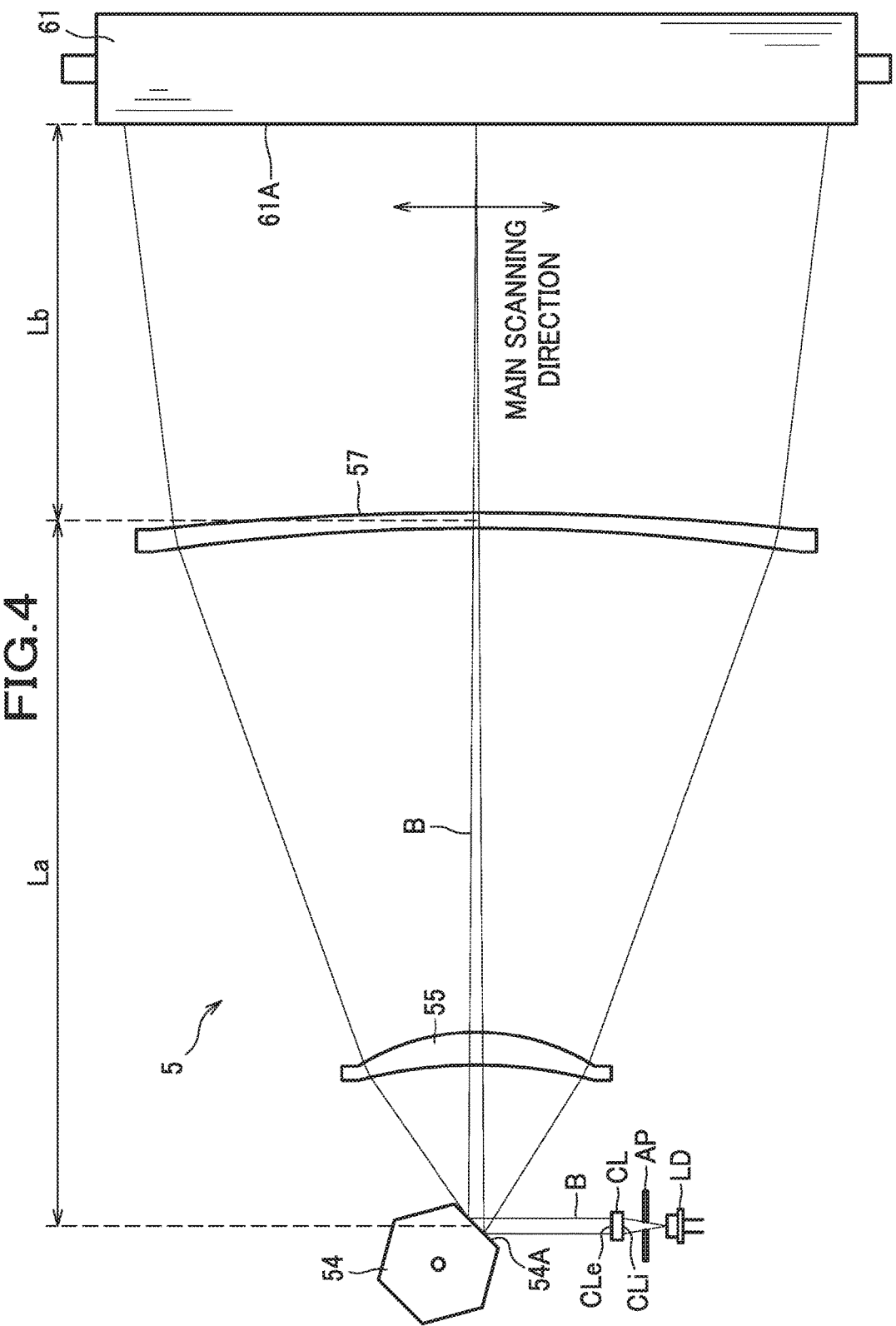
FIG. 4 is a section of the entire optical system taken along a main scanning direction.

As seen in FIG. 4, in the scanning optical system, a distance Lb from the correcting lens 57 to the image surface 61A is smaller than a distance La from the polygon mirror 54 to the correcting lens 57. The f-theta lens 55 refracts the light beam B mainly in the main scanning direction, and the correcting lens 57 refracts the light beam B mainly in the sub-scanning direction. In other words, the correcting lens 57 that is the lens closest to the image surface 61A has the largest refractive power in the sub-scanning direction in the scanning optical system.

According to the arrangement as described above, a lateral magnification βs2 of the scanning optical system in the sub-scanning direction satisfies βs2<1 in this exemplary embodiment. Since the lateral magnification βs2 of the scanning optical system in the sub-scanning direction is smaller than 1, the sensitivity of the scanning optical system (i.e., change in the formed image affected by any manufacturing error of the lens) will not increase too much. Accordingly, the f-theta lens 55 and the correcting lens 57 tend to tolerate the manufacturing error and thus can be manufactured easily.

Further, the scanning optical unit 5 satisfies $$0.01 \leq (\beta s/\beta m)^2 \leq 0.27$$

where βm is a lateral magnification of the entire optical system from the semiconductor laser LD to the image surface 61A in the main scanning direction, and βs is a lateral magnification of this entire optical system in the sub-scanning direction. Accordingly, even if βs2 is small, the distance from the coupling lens CL to the polygon mirror 54 can be made shorter because the value of $(\beta s/\beta m)^2$ is smaller than or equal to 0.27. In other words, the light path length of the incident optical system can be reduced. Further, in the incident optical system such as shown in FIG. 2, the layout in which the light beam B travels perpendicularly to the direction of arrangement of the photoconductor drums 61 becomes feasible with ease. Furthermore, the size of the scanning optical unit 5 in the lateral direction can be reduced by arranging the light source devices 51Y, 51M, 51C, 51K at positions closer to the polygon mirror 54.

Setting the value of $(\beta s/\beta m)^2$ greater than or equal to 0.01 makes it possible to prevent the light path length of the incident optical system from becoming too short, and thus the degree of freedom in the design of the scanning optical unit 5 can be improved.

Figure 5:
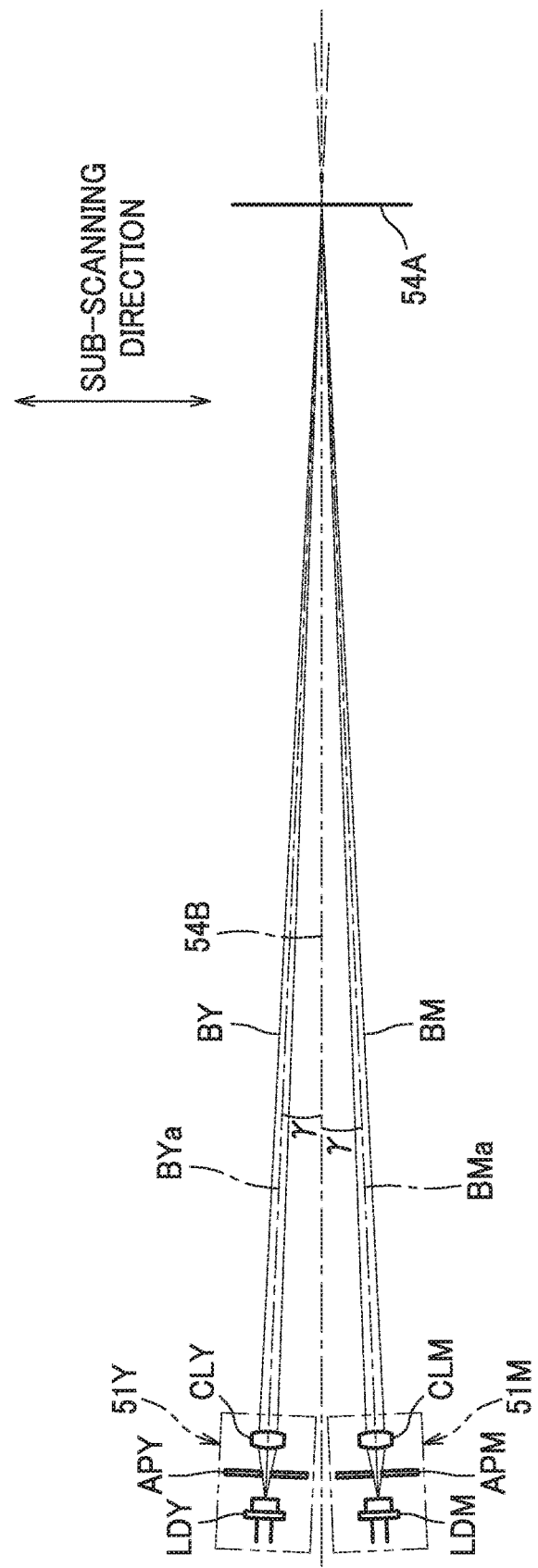
FIG. 5 is a section of incident optical systems taken along a sub-scanning direction.

As seen in FIG. 5, the incident optical system is disposed such that in the section taken along the sub-scanning direction, the light beam B obliquely enters the reflecting surface 54A of the polygon mirror 54. To be more specific, the light source device 51M including the coupling lens CLM is disposed such that the light beam BM obliquely upwardly enters the reflecting surfaces 54A of the polygon mirror 54 from below at an incident angle γ, while the light source device 51Y including the coupling lens CLY is disposed such that the light beam BY obliquely downwardly enters the reflecting surfaces 54A of the polygon mirror 54 from above at an incident angle γ. This makes it possible to cause the light beam B to enter one reflecting surface 54A of the polygon mirror 54 from a plurality of different directions and to exit from the reflecting surface 54A in different directions.

Herein, the incident angle γ is an angle made by a straight line 54B orthogonal to the reflecting surface 54A of the polygon mirror 54 and an optical axis BYa, BMa of the incident optical system (coupling lens CLY, CLM), in a section taken along the sub-scanning direction. The optical axis of the coupling lens CL (i.e., imaginary line passing through the center of the incident-side surface CLi and the center of the exit-side surface CLe of the coupling lens CL) is coincident with the optical axis of the incident optical system.

Preferably, the incident angle γ may be in a range of 1.8 to 4.0. If the incident angle γ is greater than or equal to 1.8 degrees, the light path lengths of two light beams B reflected by the reflecting surface MA of the polygon mirror 54 can be separated with ease. If the incident angle γ is smaller than or equal to 4.0 degrees, the distance between the light source device 51Y and the light source device 51M that are arranged at positions different in the sub-scanning direction will not become too large, so that the incident optical system can be stored compactly within the casing 50 of the scanning optical unit 5.

According to the scanning optical unit 5 configured as described above, since the lateral magnification βs2 of the scanning optical system in the sub-scanning direction is smaller than 1, the sensitively of the scanning optical system will not increase too much. Accordingly, the scanning optical unit 5 may tolerate the manufacturing error and thus can be manufactured easily. Further, even if βs2 is small, the light path length of the incident optical system can be reduced because the value of $(\beta s/\beta m)^2$ is smaller than or equal to 0.27. This makes it possible to downsize the scanning optical unit 5.

Although the scanning optical unit 5 and the color printer 1 equipped with the scanning optical unit 5 according to this embodiment have been described in detail, various changes and modifications may be made to any of the specific configurations without departing from the scope of the appended claims.

For example, the scanning optical unit is applied to the color printer in the above exemplary embodiment. However, the scanning optical unit may be applicable to a monochrome printer. The scanning optical unit may also be applicable to other image forming apparatuses such as a multifunction peripheral and a copying machine.

The various lenses of the color printer 1 are made of plastic in the above exemplary embodiment. However, one or more or all of the lenses may be made of glass. Further, one single lens may constitute the scanning optical system.

In the above exemplary embodiment, the polygon mirror 54 is described as an example of an optical deflector. However, a vibrating mirror (galvanometer mirror unit) may be employed as the optical deflector. A photoconductor belt may be employed as a photoconductor.

Various elements described in the above exemplary embodiment and in each of the modified embodiments can be combined together as appropriate.

Next, some examples of the scanning optical unit according to the above disclosure may be described below.

Example 1

The optical system for putting a scanning optical unit according to Example 1 into practice may be configured as follows.
Wavelength of semiconductor laser: 780 nm
Incident optical system
   Focal distance in main scanning direction: 12.5 mm
   Lateral magnification βs1 in sub-scanning direction: 2.45
   Incident angle γ of light beam incident on polygon mirror in sub-scanning direction: 3.42 degrees
   Distance from light source to reflecting surfaces of polygon mirror: 43.1 mm
Scanning optical system
   F-theta coefficient: 230 mm
   Lateral magnification βs2 in sub-scanning direction: 0.75
Entire optical system
   Lateral magnification βm in main scanning direction: 18.4
   Lateral magnification βs in sub-scanning direction: 1.84
   In the optical system according to Example 1, βs2 is 0.75, so that βs2<1 is satisfied.

Further, $(\beta s/\beta m)^2$ is 0.01. Therefore, $0.01 \leq (\beta s/\beta m)^2 \leq 0.27$ is satisfied.

Example 2

The optical system for putting a scanning optical unit according to Example 2 into practice may be configured as follows.
Wavelength of semiconductor laser: 780 nm
Incident optical system
  Focal distance in main scanning direction: 12.5 mm
  Lateral magnification βs1 in sub-scanning direction: 6.98
  Incident angle γ of light beam incident on polygon mirror in sub-scanning direction: 2.00 degrees
  Distance from light source to reflecting surfaces of polygon mirror: 103.3 mm
Scanning optical system
  F-theta coefficient: 165 mm
  Lateral magnification βs2 in sub-scanning direction: 0.865
Entire optical system
  Lateral magnification βm in main scanning direction: 11.7
  Lateral magnification βs in sub-scanning direction: 6.04
  In the optical system according to Example 2, βs2 is 0.865, so that βs2<1 is satisfied.
Further, $(\beta s/\beta m)^2$ is 0.265. Therefore, $0.01 \leq (\beta s/\beta m)^2 \leq 0.27$ is satisfied.

What is claimed is:

1. A scanning optical unit comprising:
   a light source;
   an incident optical system including one coupling lens configured to convert light emitted from the light source into a light beam;
   an optical deflector having a reflecting surface and configured to reflect and deflect the light beam from the incident optical system in a main scanning direction; and
   a scanning optical system configured to focus the light beam deflected by the optical deflector on an image surface,
   wherein the incident optical system is configured to converge the light beam on the reflecting surface of the optical deflector in a sub-scanning direction orthogonal to the main scanning direction, and
   wherein the following conditions are satisfied:

$0.01 \leq (\beta s/\beta m)^2 \leq 0.27$ and $\beta s2 < 1$ where βm is a lateral magnification of an entire optical system from the light source to the image surface in the main scanning direction, βs is a lateral magnification of the entire optical system in the sub-scanning direction, and βs2 is a lateral magnification of the scanning optical system from the reflecting surface of the optical deflector to the image surface in the sub-scanning direction.

2. The scanning optical unit according to claim 1, wherein the incident optical system is disposed such that in the sub-scanning direction, a light axis of the light beam enters obliquely to the reflecting surface of the optical deflector.

3. The scanning optical unit according to claim 2, wherein the following condition is satisfied:

$1.8 \leq \gamma \leq 4.0$ where γ is an incident angle (degree) of the light beam incident on the reflecting surface in the sub-scanning direction.

4. The scanning optical unit according to claim 1, wherein the scanning optical system comprises a first lens and a second lens between the optical deflector and the image surface, and
   wherein the second lens is disposed between the first lens and the image surface, and a refractive power of the second lens in the sub-scanning direction is larger than a refractive power of the first lens in the sub-scanning direction.

5. The scanning optical unit according to claim 1, wherein the light source includes a plurality of light emitters.

6. The scanning optical unit according to claim 1, wherein the coupling lens has a diffraction surface at an incident-side surface thereof.

7. The scanning optical unit according to claim 6, wherein a refractive power in the sub-scanning direction is greater than a refractive power in the main scanning direction at an exit-side surface of the coupling lens.

8. The scanning optical unit according to claim 6, wherein the coupling lens is made of plastic.

9. An image forming apparatus comprising:
   a photoconductor;
   a scanning optical unit configured to expose the photoconductor to light to form an electrostatic latent image on the photoconductor; and
   a development unit configured to develop the electrostatic latent image formed on the photoconductor,
   wherein the scanning optical unit includes:
     a light source;
     an incident optical system including one coupling lens configured to convert light emitted from the light source into a light beam;
     an optical deflector having a reflecting surface and configured to reflect and deflect the light beam from the incident optical system in a main scanning direction; and
     a scanning optical system configured to focus the light beam deflected by the optical deflector on the photoconductor,
   wherein the incident optical system is configured to converge the light beam on the reflecting surface of the optical deflector in a sub-scanning direction orthogonal to the main scanning direction, and
   wherein the following conditions are satisfied:

$0.01 \leq (\beta s/\beta m)^2 \leq 0.27$ and $\beta s2 < 1$ where βm is a lateral magnification of an entire optical system from the light source to the photoconductor in the main scanning direction, βs is a lateral magnification of the entire optical system in the sub-scanning direction, and βs2 is a lateral magnification of the scanning optical system from the reflecting surface of the optical deflector to the photoconductor in the sub-scanning direction.

10. The image forming apparatus according to claim 9, wherein the incident optical system is disposed such that in the sub-scanning direction, a light axis of the light beam enters obliquely to the reflecting surface of the optical deflector.

11. The image forming apparatus according to claim 10, wherein the following condition is satisfied:

$1.8 \leq \gamma \leq 4.0$ where γ is an incident angle (degree) of the light beam incident on the reflecting surface in the sub-scanning direction.

12. The image forming apparatus according to claim 9, wherein the scanning optical system comprises a first lens and a second lens between the optical deflector and the photoconductor, and
wherein the second lens is disposed between the first lens and the photoconductor and a refractive power of the second lens in the sub-scanning direction is larger than a refractive power of the first lens in the sub-scanning direction.

13. The image forming apparatus according to claim 9, wherein the coupling lens has a diffraction surface at an incident-side surface thereof.

14. The image forming apparatus according to claim 13, wherein a refractive power in the sub-scanning direction is greater than a refractive power in the main scanning direction at an exit-side surface of the coupling lens.

15. An image forming apparatus comprising:
a plurality of photoconductors;
a scanning optical unit configured to expose the plurality of photoconductors to light to form electrostatic latent images on the plurality of photoconductors; and
a plurality of development units configured to develop the respective electrostatic latent images formed on the plurality of photoconductors;
wherein the scanning optical unit includes:
  a plurality of light sources;
  a plurality of incident optical systems each having one coupling lens configured to convert light emitted from one of the plurality of light sources into a light beam;
  a single optical deflector having a reflecting surface and configured to reflect and deflect a plurality of light beams from the plurality of incident optical systems in a main scanning direction; and
  a scanning optical system configured to focus the plurality of light beams deflected by the optical deflector each on a corresponding photoconductor,
wherein each of the incident optical systems is configured to converge the light beam on the reflecting surface of the optical deflector in a sub-scanning direction orthogonal to the main scanning direction, and is disposed such that in the sub-scanning direction, the light beam is incident obliquely on the reflecting surface of the optical deflector, and
wherein the following conditions are satisfied:

$$0.01 \leq (\beta s/\beta m)^2 \leq 0.27 \text{ and}$$

$$\beta s2 < 1$$

where $\beta m$ is a lateral magnification of an entire optical system from each of the plurality of light sources to the corresponding photoconductor in the main scanning direction, $\beta s$ is a lateral magnification of the entire optical system in the sub-scanning direction, and $\beta s2$ is a lateral magnification of the scanning optical system from the reflecting surface of the optical deflector to the corresponding photoconductor in the sub-scanning direction.

16. The image forming apparatus according to claim 15, wherein the following condition is satisfied:

$$1.8 \leq \gamma \leq 4.0$$

where $\gamma$ is an incident angle (degree) of each of the plurality of light beams incident on the reflecting surface in the sub-scanning direction.

17. The image forming apparatus according to claim 15, wherein the scanning optical system comprises a plurality of lenses, and in each set of lenses a light beam from one of the plurality of light sources propagates to a corresponding photoconductor,
wherein each set of lenses comprises a first lens and a second lens between the optical deflector and a corresponding photoconductor, and
wherein the second lens is disposed between the first lens and the photoconductor, and a refractive power of the second lens in the sub-scanning direction is larger than a refractive power of the first lens in the sub-scanning direction.

18. The image forming apparatus according to claim 15, wherein each of the plurality of the light sources includes a plurality of light emitters.

19. The image forming apparatus according to claim 15, wherein the coupling lens has a diffraction surface at an incident-side surface thereof.

20. The image forming apparatus according to claim 19, wherein a refractive power in the sub-scanning direction is greater than a refractive power in the main scanning direction at an exit-side surface of the coupling lens.

* * * * *